US012551390B2

(12) United States Patent
Ye et al.

(10) Patent No.: US 12,551,390 B2
(45) Date of Patent: Feb. 17, 2026

(54) MULTIFUNCTIONAL CARE DEVICE

(71) Applicants: Kong Meng Ye, Eindhoven (NL); Lai Joo Chia, Muar (MY)

(72) Inventors: Kong Meng Ye, Eindhoven (NL); Lai Joo Chia, Muar (MY)

( * ) Notice: Subject to any disclaimer, the term of this patent is extended or adjusted under 35 U.S.C. 154(b) by 209 days.

(21) Appl. No.: 18/251,239

(22) PCT Filed: Dec. 7, 2020

(86) PCT No.: PCT/CN2020/134273
§ 371 (c)(1),
(2) Date: Apr. 30, 2023

(87) PCT Pub. No.: WO2022/099835
PCT Pub. Date: May 19, 2022

(65) Prior Publication Data

US 2023/0390133 A1 Dec. 7, 2023

(30) Foreign Application Priority Data

Nov. 13, 2020 (CN) ......................... 202011270035.9

(51) Int. Cl.
*A61G 7/07* (2006.01)
*A61G 7/015* (2006.01)
(Continued)

(52) U.S. Cl.
CPC ............ *A61G 7/015* (2013.01); *A61G 7/018* (2013.01); *A61G 7/07* (2013.01); *A61G 7/0755* (2013.01)

(58) Field of Classification Search
CPC ........ A61G 7/07; A61G 7/0755; A61G 5/006; A61G 7/1015; A61G 7/1051; A61G 5/10;
(Continued)

(56) References Cited

U.S. PATENT DOCUMENTS 1,588,573 A * 6/1926 Edmiston ............ A61G 7/1044 5/302
3,936,893 A * 2/1976 Anderson ............. A61G 5/006 297/90

(Continued)

*Primary Examiner* — Fredrick C Conley
(74) *Attorney, Agent, or Firm* — Michael D. Eisenberg

(57) ABSTRACT

The multifunctional care device comprises a first functional part, a second functional part and a third functional part. The first functional part and the second functional part may be combined into a combined part for use according to use requirements. The combined part may be used in cooperation with the third functional part. The second functional part comprises a second main body frame and a supporting rod, wherein the second main body frame comprises three movable plates which are connected in sequence, and every two adjacent movable plates are rotatable. The third functional part comprises a front frame, a rear frame, a connecting frame, an upper frame and driving devices. The upper frame is arranged above the front frame and the rear frame. Guide rails that extend horizontally are arranged on the inner side of the connecting frame. The first functional part of the present invention can be combined with the second functional part to form an assembly with a wheelchair function, and, according to the needs of use, the assembly can be used in conjunction with the third functional part to perform active stretching and positioning for the user. Transfer, flexible overall structure, effectively reduce nursing pressure, strong practicability, and strong promotional significance.

12 Claims, 8 Drawing Sheets

(51) Int. Cl.
*A61G 7/018* (2006.01)
*A61G 7/075* (2006.01)

(58) Field of Classification Search
CPC . A61G 7/02; A61G 7/05; A61G 7/057; A61G 7/0573; A61G 7/1001; A61G 7/1073; A61H 2201/0142; A61H 2201/149; A61H 1/0237; A61H 2201/1215; A61H 1/0222; A61H 2201/1207; A61H 2205/10
See application file for complete search history.

(56) References Cited

U.S. PATENT DOCUMENTS

| | | | | | |
|---|---|---|---|---|---|
| 5,235,712 | A * | 8/1993 | Smith | A61G 7/1003<br>4/585 |
| 5,555,582 | A * | 9/1996 | Jerideau | A61G 7/00<br>5/613 |
| 6,006,376 | A * | 12/1999 | Williamson | A61G 7/1046<br>5/81.1 R |
| 8,621,691 | B1 * | 1/2014 | Alsaffar | A61H 23/0263<br>5/613 |
| 9,295,596 | B2 * | 3/2016 | He | A61G 7/00 |
| 2005/0044629 | A1 * | 3/2005 | Rouse | A61G 7/1055<br>5/81.1 R |

* cited by examiner

MULTIFUNCTIONAL CARE DEVICE

CROSS-REFERENCE TO RELATED APPLICATIONS

This application is a 371 of International Application PCT/CN2020/134273, filed on Dec. 7, 2020, which claims priority from Chinese Patent Application CN202011270035.9, filed on Nov. 13, 2020. Both of the above applications are hereby incorporated herein by reference in the respective in its entirety.

BACKGROUND OF THE INVENTION

The present invention relates to a nursing appliances, in particular to a multifunctional care device.

Many patients suffer from physical inconvenience such as paralysis due to diseases or trauma, and need to stay in bed for a long time. Because of being in a bedridden state for a long time, a bedridden patient is prone to bed sores and suffers great pain if the patient is not given regular care. In the process of nursing care of bedridden patients, when a patient is heavy, the medical staff will consume much energy to turn over for the patient, which makes the work difficult for the medical staff.

In addition, for some people who work for a long time and have physical abnormalities, the traditional nursing bed does not have the functions of relaxing and stretching muscles of the user, which further restricts the practicability of the nursing bed and brings troubles to the user.

SUMMARY OF THE INVENTION

In view of this, it is necessary to provide multifunctional care device to address the deficiencies in the prior art.

A multifunctional care device, comprising a first functional part, a second functional part and a third functional part, wherein the first functional part and the second functional part can be combined into a combined part for use according to use requirements; the combined part can be used in cooperation with the third functional part; the first functional part comprises a first main body frame; the second functional part comprises a second main body frame and a supporting rod, wherein the second main body frame comprises three movable plates, a footrest and a plurality of bolts; the three movable plates are connected in sequence; connecting plates are arranged at positions on both sides of each movable plate, which are close to another movable plate; each connecting plate is provided with plug holes, and the bolts pass through the connecting plates on the same sides of the adjacent two movable plates and the plug holes in the connecting plates at the same time, such that the two adjacent connecting plates are rotatable around the bolts; among the three movable plates, one movable plate is used to support the feet of a user, one movable plate is used to support the hip of the user, and the remaining movable plate is used to support the head and the back of the user; the footrest is arranged at the tail end of the movable plate used to support the feet of the user; two hanging rings are respectively arranged on the two movable plates used to support the feet and the back; the hanging rings are arranged on both sides of the end of each movable plate.

The third functional part comprises a front frame, a rear frame, a connecting frame, an upper frame and driving devices; the front frame and the rear frame are connected to the front and the back of the connecting frame; the upper frame is arranged above the front frame and the rear frame; and the guide rails that extend horizontally are arranged on the inner side of the connecting frame.

Further, the driving devices of the third functional part are arranged on the upper frame; two sets of driving devices are provided, each of which comprises a motor, a rotating shaft connected to the motor, reels arranged on two ends of the rotating shaft, pulling ropes wound on the reels, and hooks arranged on the pulling ropes; each motor drives the rotating shaft to rotate to perform winding and unwinding processes; and when the reels perform the winding process, the hooks can pull the movable plates to perform positional adjustment, in order to perform positional adjustment according to actual needs of the user.

Further, the first main body frame comprises two frame bodies and several crossbeams connecting the frame bodies; sliding wheels are arranged under the front and back positions of each frame body; a supporting plate is connected to the rear side of the upper end of the first main body frame; a clamping slot that extends horizontally is formed in the upper end surface of the supporting plate; the middle of the supporting rod can be bent into a first mounting section and a second mounting section; and when the first functional part is used in cooperation with the second functional part, the first mounting section is attached to the movable plates, and the second mounting section is inserted into the clamping slot of the supporting plate.

Further, a movable pin and a positioning seat are arranged on the movable plate of the second functional part, which is used to support the back; the mounting seat is mounted to the back of the movable plate; the movable pin is movable horizontally on the positioning seat; the first mounting section is provided with a via hole; and the movable pin can be inserted into the via hole, such that the first mounting section is fixed with the movable plate.

Further, the second functional part further comprises several fixing parts each of which extends into the clamping slot from the outside, thereby limiting the second mounting section.

Further, a position, close to the front side, of the upper end of one frame body is provided with a telescopic hole and a clamping pin arranged in the telescopic hole; the clamping pin can move forward and extend to the outside for clamping; and the clamping pin can also contract inwards into the telescopic hole of the frame body.

Further, a horizontally-penetrated limiting hole is further formed in the middle of the front side of each frame body; an internal space of the limiting hole is configured in a shape of a water drop having a wide top and a narrow bottom; the connecting frame further comprises bottom feet each provided with a positioning hole, wherein the height and hole type of the positioning hole are consistent with those of the limiting hole of the first functional part; and the first functional part also comprises a connecting strip, which extends into the limiting hole and the positioning hole at the same time, and connecting heads are clamped on the outside.

Further, the connecting strip comprises a connecting column and connecting heads connected to both ends of the connecting column; each connecting head is arranged in a spherical shape, and the connecting column is arranged in a rod shape; and an outer diameter of the connecting head is larger than that of the connecting column, such that the connecting head can extend from the upper side of the limiting hole and be clamped on the bottom side of the limiting hole.

Further, two assembling plates are convexly arranged at the rear position of the upper end of each frame body, and each assembling plate is provided with a transversely-penetrated through hole.

Further, a limiting rod is arranged in the middle of the front frame, and freely assembled onto or disassembled from the front frame.

The multifunctional care device of the present invention has the beneficial effects: due to the arrangement of the first functional part, the second functional part and the third functional part, the first functional part and the second functional part may be combined into the combined part with a wheelchair function for use. Moreover, the combined part may be used in cooperation with the third functional part according to use requirements. The movable plates become into a bed by means of the guide rails of the third functional part, and then, a user is moved, stretched and positionally transferred in cooperation with the driving devices of the third functional part. Therefore, a nursing pressure is effectively relieved, and the overall structure is flexible. In addition, the multifunctional care device has the functions of relaxation and muscle stretching, and also has strong practicability and strong promotion significance.

DETAILED DESCRIPTION OF THE INVENTION

Figure 1:
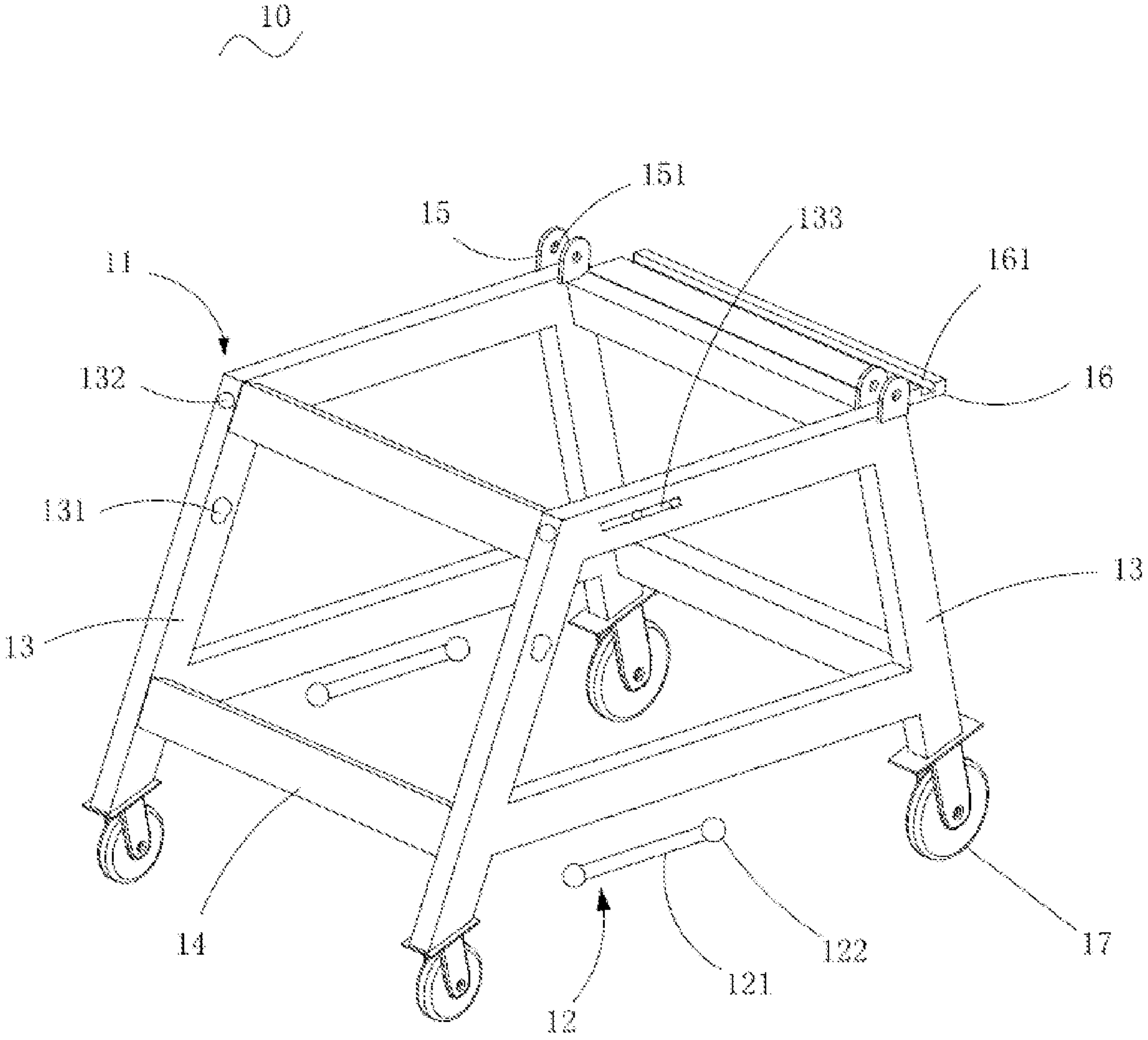
FIG. 1 is a schematic structural diagram of a first functional part of multifunctional care device of the present invention.
Figure 2:
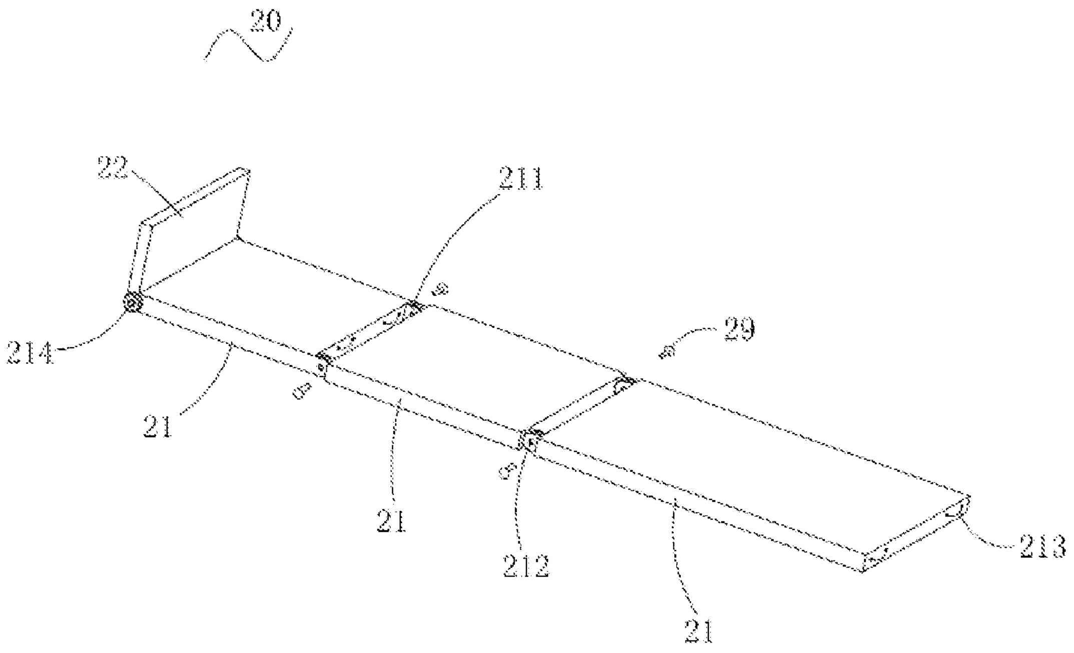
FIG. 2 is a schematic structural diagram when movable plates of the second functional part on the multifunctional care device shown in FIG. 1 cooperate with each other.
Figure 3:
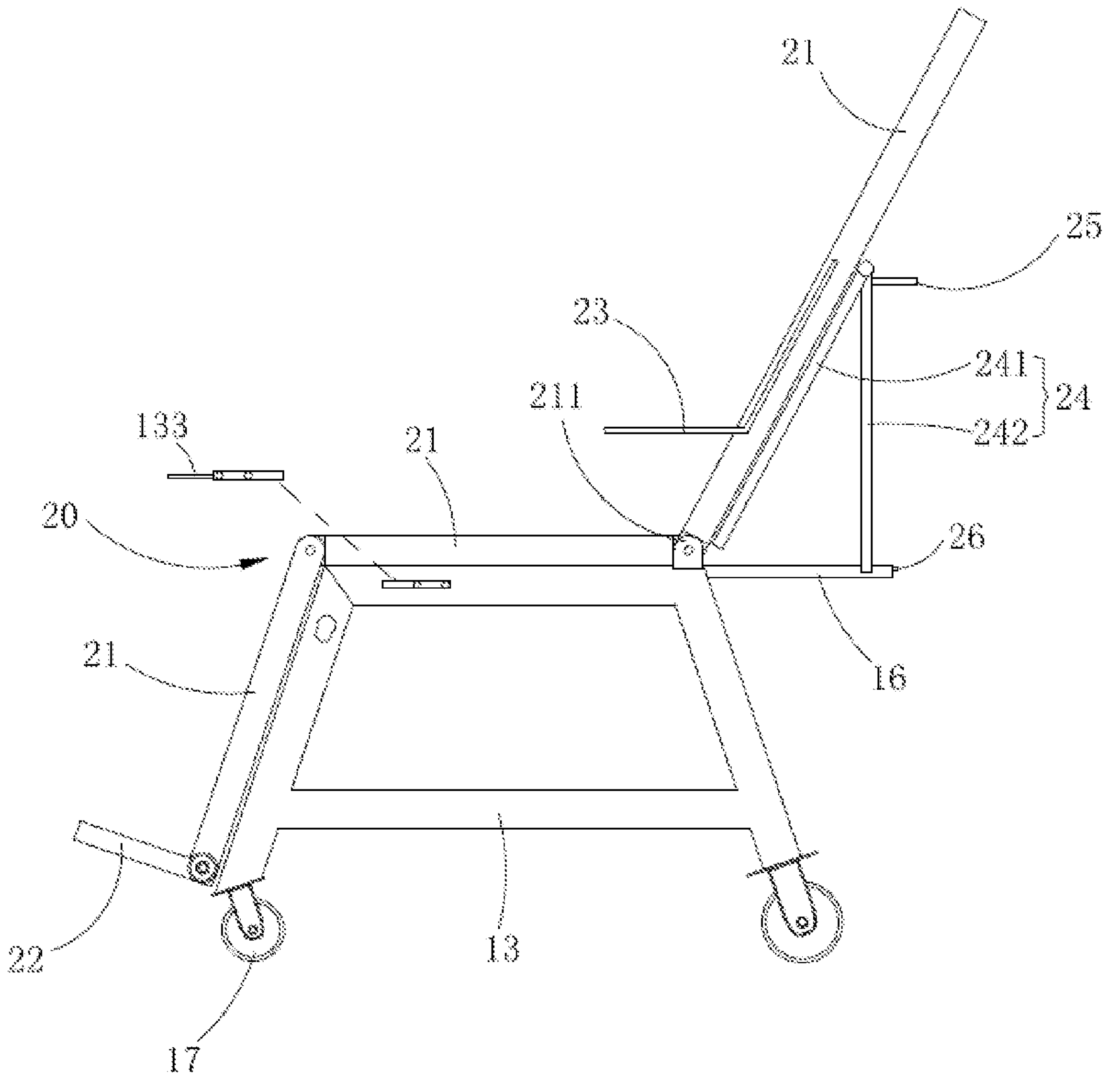
FIG. 3 is a schematic structural diagram when the first functional part and the second functional part of the present invention are used in cooperation with each other.
Figure 4:
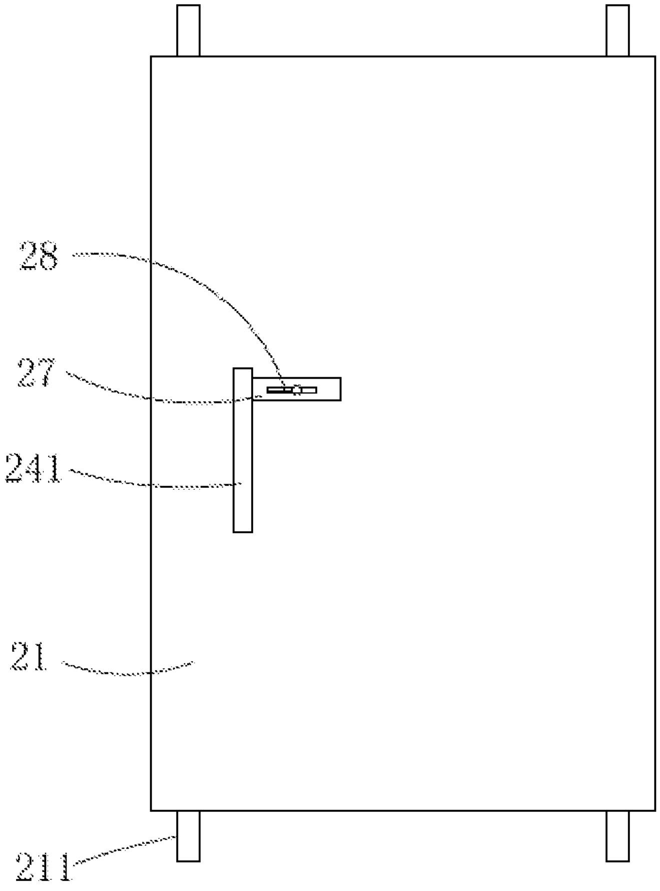
FIG. 4 is a schematic structural diagram when a supporting rod and a movable plate of the multifunctional care device are mounted in cooperation with each other.
Figure 5:
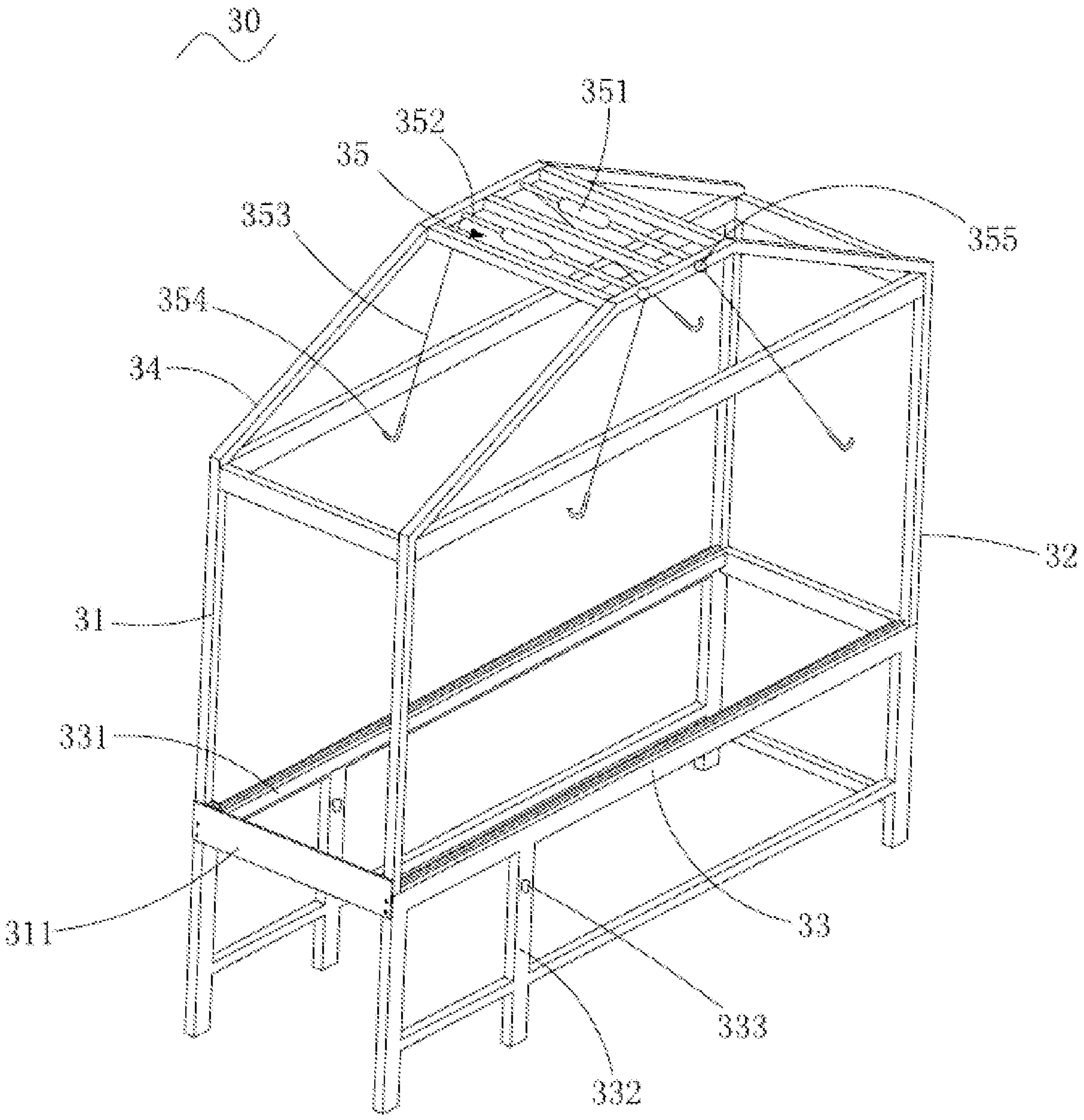
FIG. 5 is a schematic structural diagram of a third functional part of the multifunctional care device of the present invention.
Figure 6:
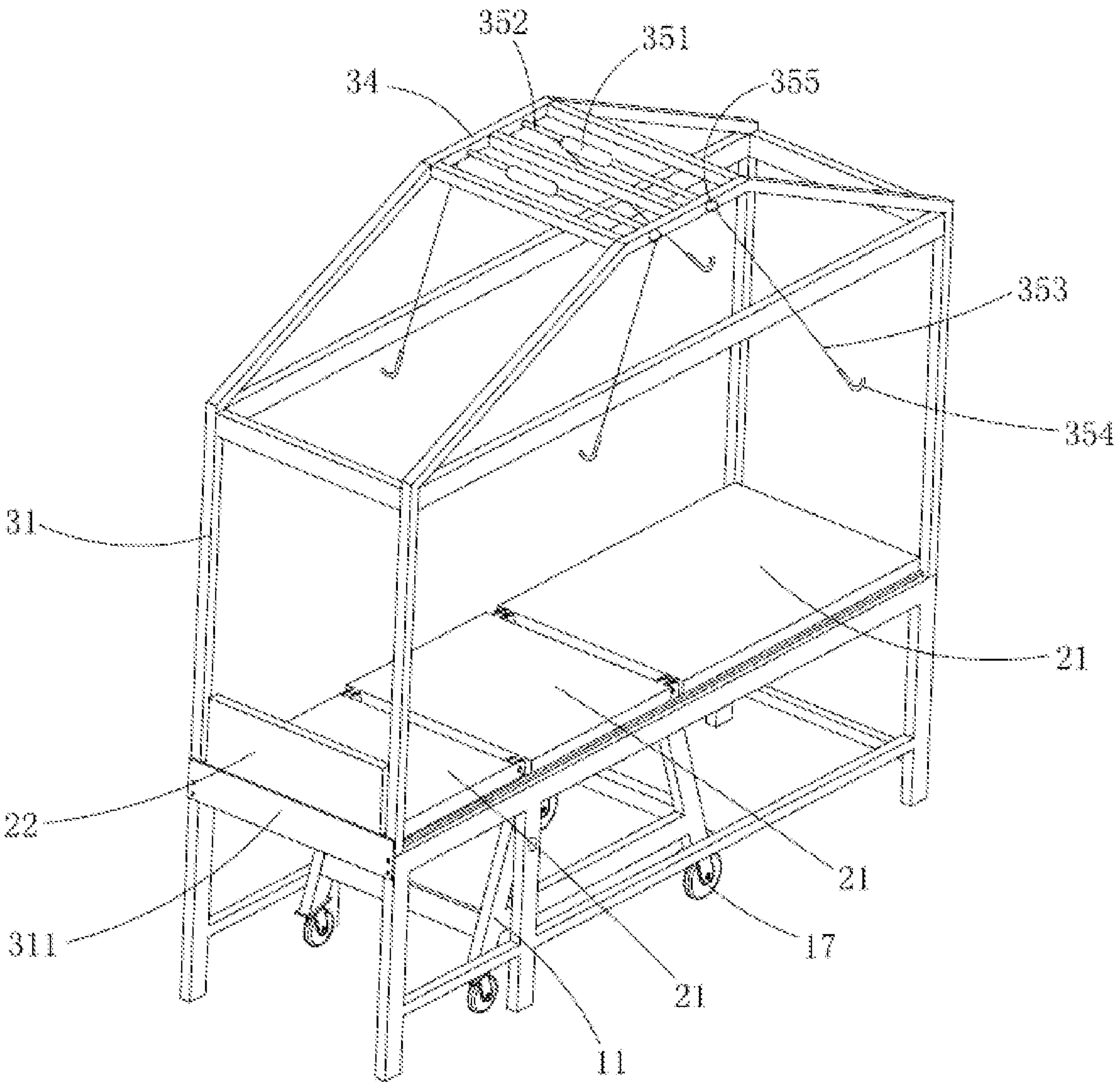
FIG. 6, FIG. 7 and FIG. 8 are schematic structural diagrams of the present invention used in different scenarios.
Figure 7:
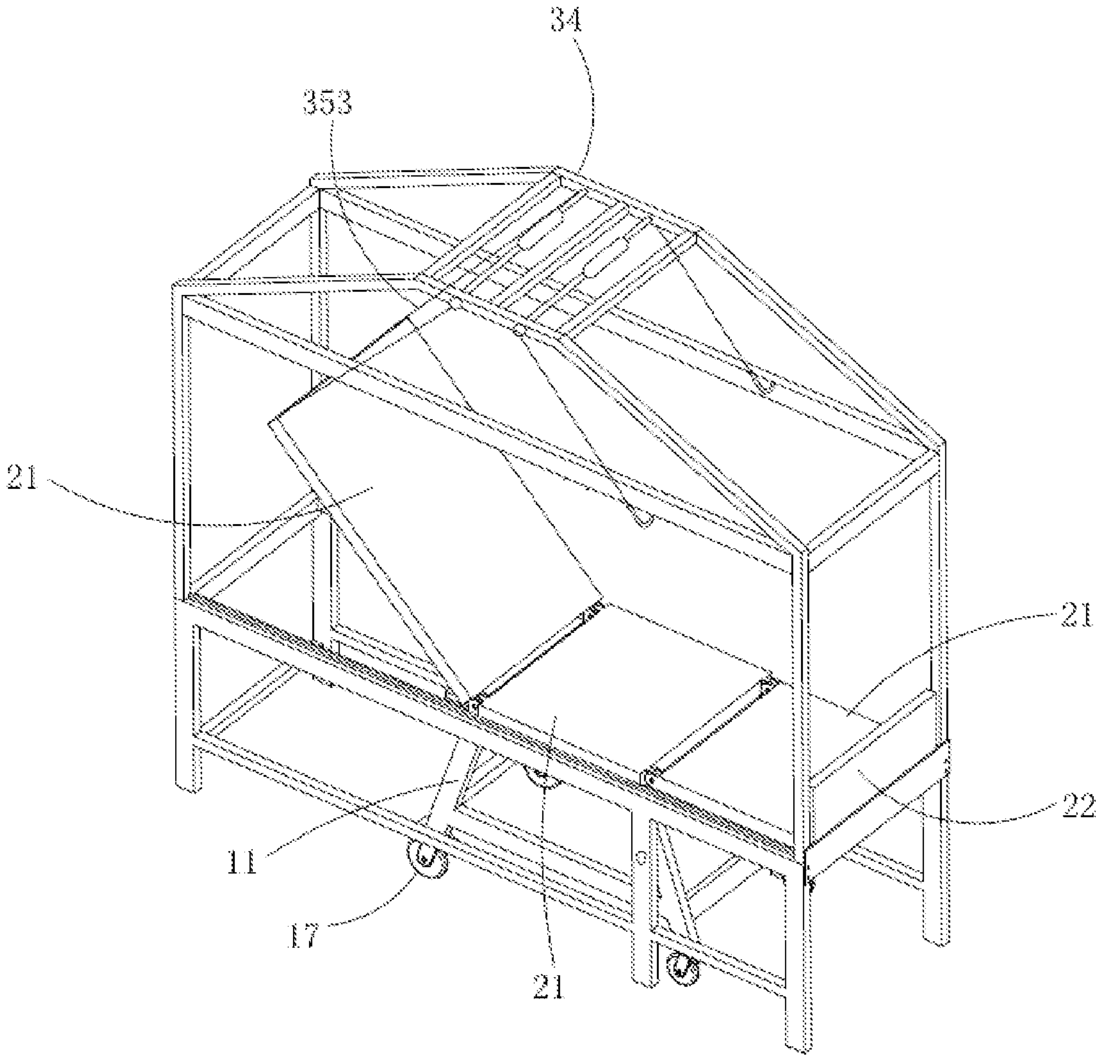
Figure 8:
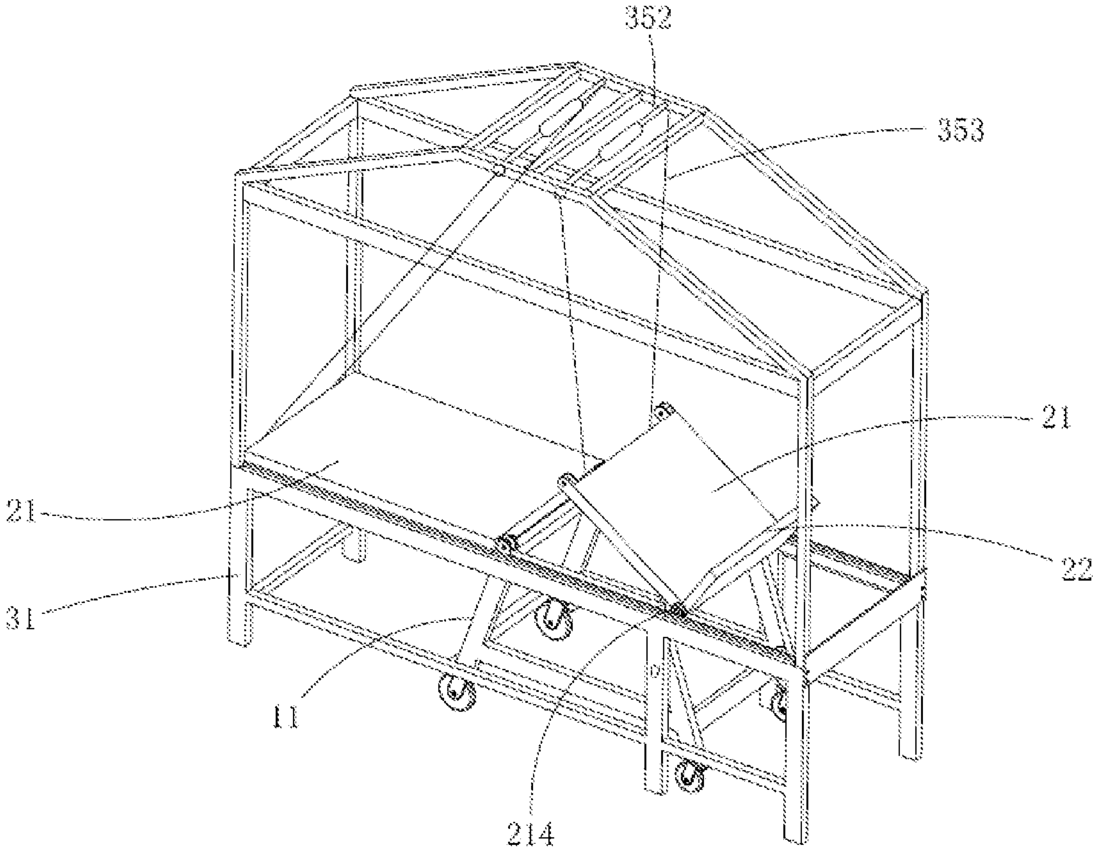

In order to make the objects, technical solutions and advantages of the present invention clearer, the following will describe the present invention in detail in conjunction with accompany drawings and embodiments.

As shown in FIGS. 1 to 7, the present invention provides multifunctional care device. The multifunctional care device comprises a first functional part 10, a second functional part 20 and a third functional part 30. The first functional part 10 and the second functional part 20 may be combined into a combined part for use according to use requirements. In addition, the combined part may be used in cooperation with the third functional part 30 according to use requirements.

The first functional part 10 comprises a first main body frame 11 and a connecting strip 12. The first main body frame 11 comprises two frame bodies 13, and several crossbeams 14 connecting the frame bodies 13. Sliding wheels 17 are arranged under the front and back positions of each frame body 13. A position, close to the front side, of the upper end of one frame body 13 is provided with a telescopic hole 132 and a clamping pin 133 arranged in the telescopic hole 132. The clamping pin 133 can move forward and extend to the outside for clamping. In addition, the clamping pin 133 can also contract inwards into the telescopic hole 132 of the frame body 13. A horizontally-penetrated limiting hole 133 is further formed in the middle of the front side of each of the two frame bodies 13. An internal space of the limiting hole 131 is configured in a shape of a water drop having a wide top and a narrow bottom. A supporting plate 16 is connected to the rear side of the upper end of the first main body frame 11. A clamping slot 161 that extends horizontally is formed in the upper end surface of the supporting plate 161. Two assembling plates 15 are convexly arranged at the rear position of the upper end of each frame body 13, and each assembling plate 15 is provided with a transversely-penetrated through hole 151.

The connecting strip 12 comprises a connecting column 121 and connecting heads 122 connected to both ends of the connecting column 121. Each connecting head 122 is arranged in a spherical shape, and the connecting column 121 is arranged in a rod shape. An outer diameter of each connecting head 122 is larger than that of the connecting column 121, such that the connecting head 122 can extend from the upper side of the limiting hole 131 and be clamped on the bottom side of the limiting hole 131.

The second functional part 20 comprises a second main body frame, an armrest 23, a supporting rod 24 and a pushing handle 25. The second main body frame comprises three movable plates 21, a footrest 22 and a plurality of bolts 29. The three movable plates 21 are connected in sequence. Connecting plates 211 are arranged at positions on both sides of each movable plate 21, which are close to another movable plate 21. Each connecting plate 211 is provided with plug holes 212, and the bolts 29 pass through the connecting plates 211 on the same sides of the adjacent two movable plates 21 and the plug holes 212 in the connecting plates 211 at the same time, such that the two adjacent connecting plates 21 are rotatable around the bolts.

Among the three movable plates 21, one movable plate is used to support the feet of a user, one movable plate is used to support the hip of the user, and the remaining movable plate is used to support the head and the back of the user. The footrest 22 is arranged at the tail end of the movable plate 21 used to support the feet of the user. Two hanging rings 213 are respectively arranged on the two movable plates 21 used to support the feet and the back. The hanging rings 213 are arranged on both sides of the end part of each movable plate 21. Two pulleys 214 are also arranged on the movable plate used to support the feet, and located on both sides of the end part of the movable plate 21.

The middle of the supporting rod 24 is provided with a hinge or a connecting piece of other form, such that the middle of the supporting rod 24 can be bent into a first mounting section 241 and a second mounting section 242.

When the first functional part 10 is used in cooperation with the second functional part 20, the first mounting section 241 is attached to the movable plates 21, and the second mounting section 242 is inserted into the clamping slot 161 of the supporting plate 16. An included angle is formed between the first mounting section 241 and the second mounting section 242, and a movable pin 28 and a positioning seat 27 are arranged on the movable plate 21 used to support the back. The positioning seat 27 is mounted to the back of the movable plate 21. The movable pin 28 is movable horizontally on the positioning seat 27. The first mounting section 241 is horizontally provided with a via hole; and the movable pin 28 can be inserted into the via hole, such that the first mounting section 241 is fixed with the movable plate 21. The second functional part 20 further includes several fixing parts 26, each of which extends into the clamping slot 161 from the outside, thereby limiting the second mounting section 242. In addition, the movable plate 21 used to support the hip is disposed above the main body frame 11, and the movable plate 21 used to the feet of the user is attached to the front side of the main body frame 11. The bolts pass through the through holes 151 in the assembling plates 15 and the plug holes 212 in the movable plate 21 at the same time. In addition, the first functional part 10 and the second functional part 20 also function to be combined into a bed. In use, the movable plate 21 used to support the feet of the user is lifted upward, the clamping pin 133 moves forward and extends to the outside; and the movable plate 21 used to support the feet of the user is limited by the clamping pin 133 and is in a flat position.

The third functional part 30 comprises a front frame 31, a rear frame 32, a connecting frame 33, an upper frame 34 and driving devices 35. The front frame 31 and the rear frame 32 are connected to the front and the back of the connecting frame 33. The upper frame 34 is arranged above the front frame 31 and the rear frame 32. Guide rails 331 that extend horizontally are arranged on the inner side of the connecting frame 33. When the second functional part 20 is disposed on the first functional part 10 and the three movable plates 21 are in a horizontal position, the height of the bottom of each movable plate 21 is flush with the upper end surface of the guide rails 331 or slightly higher than the guide rails 331. A limiting rod 311 is arranged in the middle of the front frame 31, and freely assembled onto or disassembled from the front frame 31. When the combined part composed of the first functional part 10 and the second functional part 20 needs to be pushed into the third functional part 30, the limiting rod 311 is disassembled from the front frame 31 first; and after the combined part is pushed into the third functional part 30, the limiting rod 311 is reinstalled on the front frame 31 with a fixing screw, thereby limiting the combined part. The connecting frame 33 further comprises bottom feet 332 each provided with a positioning hole 333, wherein the height and hole type of each positioning hole 333 are consistent with those of the limiting hole 131 of the first functional part 10. The connecting strip 12 extends into the limiting hole 131 and the positioning hole 333 at the same time. The connecting heads are clamped on the outside, such that the connecting strip can limit the main body frame of the first functional part 10 and the third functional part 30.

Figure 9:
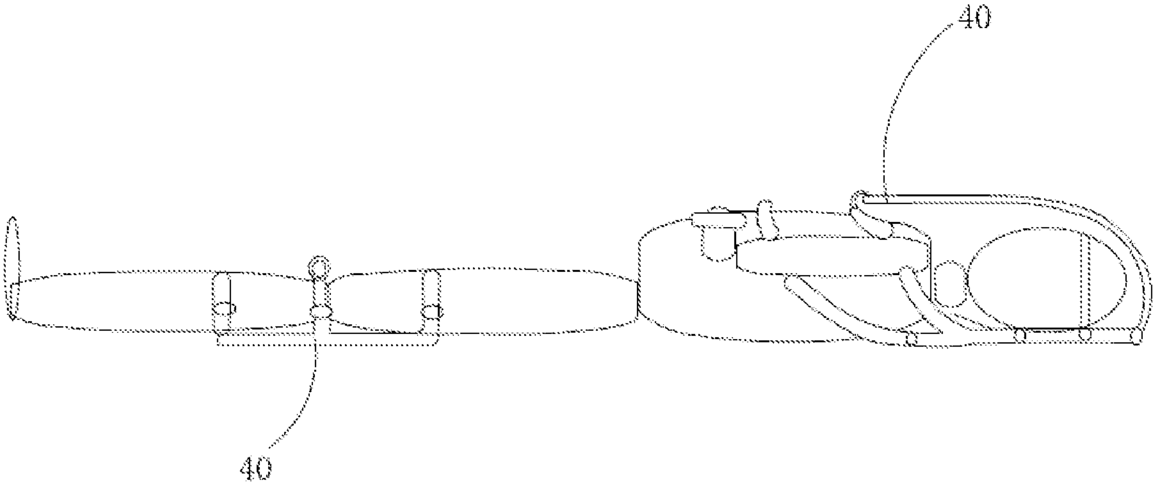
FIG. 9 is a schematic structural diagram after the user is tied with straps.

The driving devices 35 of the third functional part 30 are arranged on the upper frame 34. Two sets of driving devices 35 are provided, each of which comprises a motor 351, a rotating shaft 352 connected to the motor 351, reels 355 arranged on two ends of the rotating shaft 352, pulling ropes 353 wound on the reels 355, and hooks 354 arranged on the pulling ropes 353. Each motor 351 drives the rotating shaft 352 to rotate to perform winding and unwinding processes. When the reels 355 perform the winding process, the hooks 354 can pull the hanging rings 213 of the movable plates 21 to perform positional adjustment, in order to perform positional adjustment according to actual needs of the user. For example, the angles of the movable plates 21 are adjusted, such that the user can lean on the movable plates 21; or the movable plate 21 equipped with the footrest 22 is pulled to lift the user's legs. In the process of pulling the movable plate 21 equipped with the footrest, the two pulleys 214 slide on the guide rails 331. In addition, during use, the user can also be tied with straps 40 (as shown in FIG. 9) with buckles, and the user can be lifted by the driving devices 35 to perform other operations, such as washing, replacing bedding, etc. The front and rear movable plates can be laid flat on the guide rails 331 from front to rear, and the middle movable plate can be removed to facilitate the user to defecate.

The multifunctional care device of the present invention has the beneficial effects: due to the arrangement of the first functional part 10, the second functional part 20 and the third functional part 30, the first functional part 10 and the second functional part 20 may be combined into the combined part with a wheelchair function for use. Moreover, the combined part may be used in cooperation with the third functional part 30 according to use requirements. The movable plates 21 of the second functional part 20 become into a bed by means of the guide rails 331 of the third functional part 30, and then, a user is moved, stretched and positionally transferred in cooperation with the driving devices 35 of the third functional part 30. Therefore, a nursing pressure is effectively relieved, and the overall structure is flexible. In addition, the multifunctional care device has the functions of relaxation and muscle stretching, and also has strong practicability and strong promotion significance.

The above-mentioned embodiments only express one implementation of the present invention, and the description is relatively specific and detailed, but it should not be understood as a limitation to the patent scope of the present invention. It should be pointed out that for those of ordinary skill in the art, without departing from the concept of the present invention, several modifications and improvements can be made, and these all fall within the protection scope of the present invention. Therefore, the protection scope of the patent of the present invention should be subject to the appended claims.

What is claimed is:

1. Multifunctional care device, comprising a first functional part, a second functional part and a third functional part, wherein:

- the first functional part and the second functional part can be combined into a combined part for use according to use requirements;
- the combined part can be used in cooperation with the third functional part;
- the first functional part comprises a first main body frame;
- the second functional part comprises a second main body frame and a supporting rod, wherein the second main body frame comprises three movable plates, and a plurality of bolts;
  - the three movable plates are connected in sequence;
  - connecting plates are arranged at positions on both sides of each movable plate, which are close to another movable plate;
  - each connecting plate is provided with plug holes, and the bolts pass through the connecting plates on the same sides of the adjacent two movable plates and the plug holes in the connecting plates at the same time, such that the two adjacent connecting plates are rotatable around the bolts;
  - among the three movable plates, one movable plate is used to support feet of a user, one movable plate is used to support a hip of the user, and the remaining movable plate is used to support a head and a back of the user;
  - two hanging rings are respectively arranged on the two movable plates used to support the feet and the back;

the hanging rings are arranged on both sides of the end of each movable plate; and the third functional part comprises a front frame, a rear frame, a connecting frame, an upper frame and driving devices;

the front frame and the rear frame are connected to a front and a back of the connecting frame;

the upper frame is arranged above the front frame and the rear frame; and guide rails that extend horizontally are arranged on an inner side of the connecting frame, wherein the guide rails are configured to provide a guide surface for sliding the combined part in and out of the third functional part.

2. The multifunctional care device according to claim 1, wherein the driving devices of the third functional part are arranged on the upper frame;

two sets of driving devices are provided, each of which comprises a motor, a rotating shaft connected to the motor, reels arranged on two ends of the rotating shaft, pulling ropes wound on the reels, and hooks arranged on the pulling ropes;

each motor drives the rotating shaft to rotate to perform winding and unwinding processes; and when the reels perform the winding process, the hooks can pull the movable plates to perform positional adjustment, in order to perform positional adjustment according to actual needs of the user.

3. The multifunctional care device according to claim 2, wherein the first main body frame comprises two frame bodies and several crossbeams connecting the frame bodies;

sliding wheels are arranged under the front and back positions of each frame body;

a supporting plate is connected to a rear side of an upper end of the first main body frame;

a clamping slot that extends horizontally is formed in the upper end surface of the supporting plate;

a middle of the supporting rod can be bent into a first mounting section and a second mounting section; and when the first functional part is used in cooperation with the second functional part, the first mounting section is attached to the movable plates, and the second mounting section is inserted into the clamping slot of the supporting plate.

4. The multifunctional care device according to claim 3, wherein a movable pin and a positioning seat are arranged on the movable plate of the second functional part, which is used to support the back of the user;

the mounting seat is mounted to a backside of the movable plate;

the movable pin is movable horizontally on the positioning seat;

the first mounting section is provided with a via hole; and the movable pin can be inserted into the via hole, such that the first mounting section is fixed with the movable plate.

5. The multifunctional care device according to claim 3, wherein the second functional part further comprises several fixing parts each of which extends into the clamping slot from outside, thereby limiting the second mounting section.

6. The multifunctional care device according to claim 3, wherein a position, close to the front side, of the upper end of one frame body is provided with a telescopic hole and a clamping pin arranged in the telescopic hole;

the clamping pin can move forward and extend outside for clamping; and the clamping pin can also contract inwards into the telescopic hole of the frame body.

7. The multifunctional care device according to claim 3, wherein a horizontally-penetrated limiting hole is further formed in the middle of the front side of each frame body;

an internal space of the limiting hole is configured in a shape of a water drop having a wide top and a narrow bottom;

the connecting frame further comprises bottom feet each provided with a positioning hole, wherein the height and hole type of the positioning hole are consistent with those of the limiting hole of the first functional part; and the first functional part also comprises a connecting strip, which extends into the limiting hole and the positioning hole at the same time, and connecting heads are clamped on the outside.

8. The multifunctional care device according to claim 7, wherein the connecting strip comprises a connecting column and connecting heads connected to both ends of the connecting column;

each connecting head is arranged in a spherical shape, and the connecting column is arranged in a rod shape; and an outer diameter of the connecting head is larger than that of the connecting column, such that the connecting head can extend from the upper side of the limiting hole and be clamped on the bottom side of the limiting hole.

9. The multifunctional care device according to claim 7, wherein two assembling plates are convexly arranged at the rear position of the upper end of each frame body, and each assembling plate is provided with a transversely-penetrated through hole.

10. The multifunctional care device according to claim 1, wherein a limiting rod is arranged in the middle of the front frame, and freely assembled onto or disassembled from the front frame.

11. The multifunctional care device according to claim 1, wherein a height of a bottom of each of the movable plates is flush with upper end surfaces of the guide rails or slightly higher than the guide rails.

12. The multifunctional care device according to claim 1, wherein the second main body comprises a footrest is arranged at the tail end of the movable plate used to support the feet of the user.

* * * * *